US012092438B2

(12) United States Patent
Fukushima et al.

(10) Patent No.: US 12,092,438 B2
(45) Date of Patent: Sep. 17, 2024

(54) IGNITION DEVICE ASSEMBLY AND IGNITION DEVICE

(71) Applicant: DAICEL CORPORATION, Osaka (JP)

(72) Inventors: Akira Fukushima, Tokyo (JP); Takaya Masumoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 44 days.

(21) Appl. No.: 18/025,810

(22) PCT Filed: Jun. 29, 2021

(86) PCT No.: PCT/JP2021/024468
§ 371 (c)(1),
(2) Date: Mar. 10, 2023

(87) PCT Pub. No.: WO2022/054376
PCT Pub. Date: Mar. 17, 2022

(65) Prior Publication Data
US 2023/0366660 A1 Nov. 16, 2023

(30) Foreign Application Priority Data
Sep. 11, 2020 (JP) .................. 2020-152670

(51) Int. Cl.
*F42B 3/26* (2006.01)
*B60R 21/26* (2011.01)
(Continued)

(52) U.S. Cl.
CPC ............... *F42B 3/26* (2013.01); *B60R 21/26* (2013.01); *F42B 3/04* (2013.01); *F42B 3/10* (2013.01); *F42B 3/12* (2013.01)

(58) Field of Classification Search
CPC .... F42B 3/04; F42B 3/10; F42B 3/103; F42B 3/107; F42B 3/12; F42B 3/26;
(Continued)

(56) References Cited

U.S. PATENT DOCUMENTS 6,820,556 B1 * 11/2004 Oda ..................... F42B 3/195
102/202.7
6,823,796 B1 * 11/2004 Amano ................. F42B 3/103
102/530

(Continued)

FOREIGN PATENT DOCUMENTS

| JP | 2002172996 A | * | 6/2002 | |
|----|----|----|----|----|
| JP | 2003-226222 A | | 8/2003 | |
| WO | WO-2020179113 A1 | * | 9/2020 | ......... B60R 21/2644 |

OTHER PUBLICATIONS

International Search Report and Written Opinion of the International Searching Authority for International Application No. PCT/JP2021/024468, dated Sep. 21, 2021, with English translation.

*Primary Examiner* — James S Bergin
(74) *Attorney, Agent, or Firm* — Birch, Stewart, Kolasch & Birch, LLP (57) ABSTRACT

An ignition device assembly includes an ignition device including an igniter body and an igniter collar member, and a housing including a tubular fixing portion to which the igniter collar member is fixed. The tubular fixing portion includes a crimping fixing portion. The igniter collar member includes a tubular wall portion having a tubular shape, made of metal, and including a connector connection space formed inside, the tubular wall portion being crimped by a crimping fixing portion, an opening end forming portion including a resin region portion and a metal region portion, extending from a tip side of the tubular wall portion and forming an opening end of the connector connection space, and a crimping tip surface opposing region portion. At least (Continued)

a part of the crimping tip surface opposing region portion is formed by the metal region portion.

12 Claims, 8 Drawing Sheets

(51) Int. Cl.
*F42B 3/04* (2006.01)
*F42B 3/10* (2006.01)
*F42B 3/12* (2006.01)

(58) Field of Classification Search
CPC ..... B60R 21/26; B60R 21/264; B60R 21/272; B60R 22/46; B60R 22/195
USPC .............................. 102/202.9, 202.11, 202.14
See application file for complete search history.

(56) References Cited

U.S. PATENT DOCUMENTS

| | | | | |
|---|---|---|---|---|
| 7,125,041 | B2* | 10/2006 | Kato | B60R 22/4628 |
| | | | | 280/736 |
| 7,793,974 | B2* | 9/2010 | Yamazaki | F42B 3/103 |
| | | | | 280/741 |
| 2003/0151241 | A1 | 8/2003 | Matsuda et al. | |
| 2004/0245753 | A1* | 12/2004 | Kato | F42B 3/04 |
| | | | | 280/736 |
| 2009/0114109 | A1 | 5/2009 | Overton et al. | |
| 2011/0233908 | A1* | 9/2011 | Chen | B60R 21/272 |
| | | | | 280/741 |
| 2012/0079959 | A1* | 4/2012 | Chen | B60R 21/272 |
| | | | | 102/530 |

* cited by examiner

IGNITION DEVICE ASSEMBLY AND IGNITION DEVICE

TECHNICAL FIELD

The present invention relates to an ignition device assembly and an ignition device.

BACKGROUND ART

Inflators for pretensioners of seat belts or inflators for airbags are known as an ignition device assembly including an ignition device and a housing to which the ignition device is fixed.

For example, Patent Document 1 discloses an inflator that inflates an airbag with combustion gas and pressurized gas, generated by combustion of a gas generating agent. In the inflator disclosed in Patent Document 1, an opening end portion of a tubular housing is bent radially inward, and a collar member of an ignition device is crimped to an end portion of the housing, whereby the ignition device is fixed to the opening end portion of the housing. In general, the collar member of the ignition device includes the igniter body held via an insulating resin material at a tubular wall portion made of a metal and having a tubular shape, and a connector connection space into which a connector to be connected to the igniter body is insertable is formed inside the tubular wall portion.

The region of the collar member on the opening end portion side of the connector connection space needs to be designed to fit a connector to be connected, and its inner peripheral surface often includes a fitting groove for fixing a protrusion on the connector side. For this reason, the opening end portion of a connector connection space is often formed of, instead of metal with high processing costs, a resin material that is injection molded on the tip side of a metal tubular wall portion.

In this regard, Patent Document 2 discloses an ignition device for an inflator of an airbag. The ignition device disclosed in Patent Document 2 includes a tubular metal body portion 12 provided with a recessed portion into which a connector is inserted therein and holding an igniter, and a collar member including a tubular plastic connection portion 16 extending from the metal body portion 12, and an opening end of the recessed portion into which the connector is inserted is formed by the plastic connection portion 16. An inner wall surface of the plastic connection portion 16 is provided with a groove 24 for fitting the connector.

CITATION LIST

Patent Document

Patent Document 1: JP 2003-226222 A
Patent Document 2: US 2009/0114109 A

SUMMARY OF INVENTION

Technical Problem

In a case where an ignition device assembly is assembled by bending an opening end portion of the housing and fixing a collar member of the ignition device by crimping, there is a possibility that an opening end forming portion is deformed radially inward when the tip surface of the bent opening end portion of the housing abuts against the resin opening end forming portion forming the opening end of a connector connection space. In particular, since the portion, of the resin opening end forming portion in a collar member, where the groove for fitting the connector is formed is thin-walled, the portion is easily deformed when the tip surface of the opening end portion of the housing is pressed, and this makes it difficult to insert the connector into the connector connection space from the outside.

The technique of the present disclosure has been made in view of the above-described problem, and an object thereof is to provide a technique of reducing deformation of an opening end forming portion that forms an opening end of a connector connection space in an igniter collar member when the igniter collar member is fixed to a housing by crimping, in an ignition device including an igniter body and the igniter collar member.

Solution to Problem

To solve the above problem, the technique of the present disclosure adopts the following configuration. That is, one aspect of the technique of the present disclosure is an ignition device assembly including: an ignition device including an igniter body and an igniter collar member holding the igniter body; and a housing including a tubular fixing portion to which the igniter collar member is fixed. The tubular fixing portion includes a crimping fixing portion in which a tip side of the tubular fixing portion is bent radially inward, the igniter collar member includes a tubular wall portion having a tubular shape, made of metal, and including a connector connection space formed inside and into which a connector to be connected to the igniter body is insertable, the tubular wall portion being crimped to the crimping fixing portion, an opening end forming portion including a resin region portion made of resin and a metal region portion made of metal, extending from a tip side of the tubular wall portion, and forming an opening end of the connector connection space, and a crimping tip surface opposing region portion formed in the opening end forming portion and opposed to a tip surface of the crimping fixing portion, and at least a part of the crimping tip surface opposing region portion is formed by the metal region portion.

Here, a portion, in the circumferential direction, of the crimping tip surface opposing region portion may be formed by the resin region portion.

The metal region portion and the resin region portion may be alternately provided along the circumferential direction of the crimping tip surface opposing region portion.

In the crimping tip surface opposing region portion, the total circumferential length in the metal region portion may be longer than the total circumferential length in the resin region portion.

The metal region portion and the resin region portion may be provided at a plurality of locations in the circumferential direction of the crimping tip surface opposing region portion, and the circumferential length in each metal region portion may be longer than the circumferential length in each resin region portion.

A fitting groove into which a locking protrusion provided on the connector can be fitted may be provided along the circumferential direction of an inner wall surface in the crimping tip surface opposing region portion.

The member thickness of the opening end forming portion may be minimized in the crimping tip surface opposing region portion.

Here, the igniter collar member may further include a resin covering portion partially being resin-molded integrally with the resin region portion, extending from the resin region portion to a base end side of the tubular wall portion, and covering an inner wall surface of the tubular wall portion. The resin covering portion may include a resin inner wall surface defining the connector connection space, and the resin inner wall surface of inner wall surface of the tubular wall portion may be connected flush with a metal inner wall surface that is not covered with the resin covering portion.

In the ignition device assembly according to the present disclosure, the opening end forming portion is formed in an annular shape, and an outer diameter of the opening end forming portion may be smaller than an outer diameter of the tubular wall portion, and the crimping fixing portion may fix a tip surface of the tubular wall portion.

The igniter body may include a pair of electro-conductive pins extending to the connector connection space, the connector connection space may be provided with a metal short-circuit member for maintaining the pair of electro-conductive pins in a short-circuit state when the connector is not inserted, and a resin holder member that holds the short-circuit member, the holder member may include a pair of holder wall surface portions arranged along the tubular wall portion and the opening end forming portion and arranged to opposite to each other, and a region sandwiched between the pair of holder wall surface portions may be provided with a hollow connector insertion portion into which the connector is insertable, and at least a part of a region arranged opposite to the pair of holder wall surface portions in the crimping tip surface opposing region portion may be formed by the metal region portion.

In the ignition device assembly according to the present disclosure, a gas generating agent ignited when the igniter body is activated may be accommodated inside the housing.

One aspect of the technique of the present disclosure may be an ignition device including an igniter body and an igniter collar member holding the igniter body, and fixed to a tubular fixing portion of a housing. The igniter collar member includes a tubular wall portion having a tubular shape, made of metal, and including a connector connection space formed inside and into which a connector to be connected to the igniter body is insertable, the tubular wall portion being crimped by a crimping fixing portion in which a tip side of the tubular fixing portion is bent radially inward, an opening end forming portion including a resin region portion made of resin and a metal region portion made of metal, extending from a tip side of the tubular wall portion, and forming an opening end of the connector connection space, and a crimping tip surface opposing region portion formed at the opening end forming portion and opposed to a tip surface of the crimping fixing portion, and at least a part of the crimping tip surface opposing region portion is formed by the metal region portion.

Advantageous Effects of Invention

The technique of the present disclosure makes it possible to provide a technique of reducing deformation of an opening end forming portion that forms an opening end of a connector connection space in an igniter collar member when the igniter collar member is fixed to a housing by crimping in an ignition device including an igniter body and the igniter collar member.

DESCRIPTION OF EMBODIMENTS

Hereinafter, an ignition device and an ignition device assembly according to embodiments of the present disclosure will be described with reference to the drawings. It should be noted that the respective configurations and the combinations thereof in the respective embodiments are mere examples, and the configurations can be added, omitted, substituted, and differently modified as appropriate within a scope not departing from the spirit of the present invention. The present disclosure is not limited by the embodiments and is limited only by the claims.

First Embodiment

Figure 1:
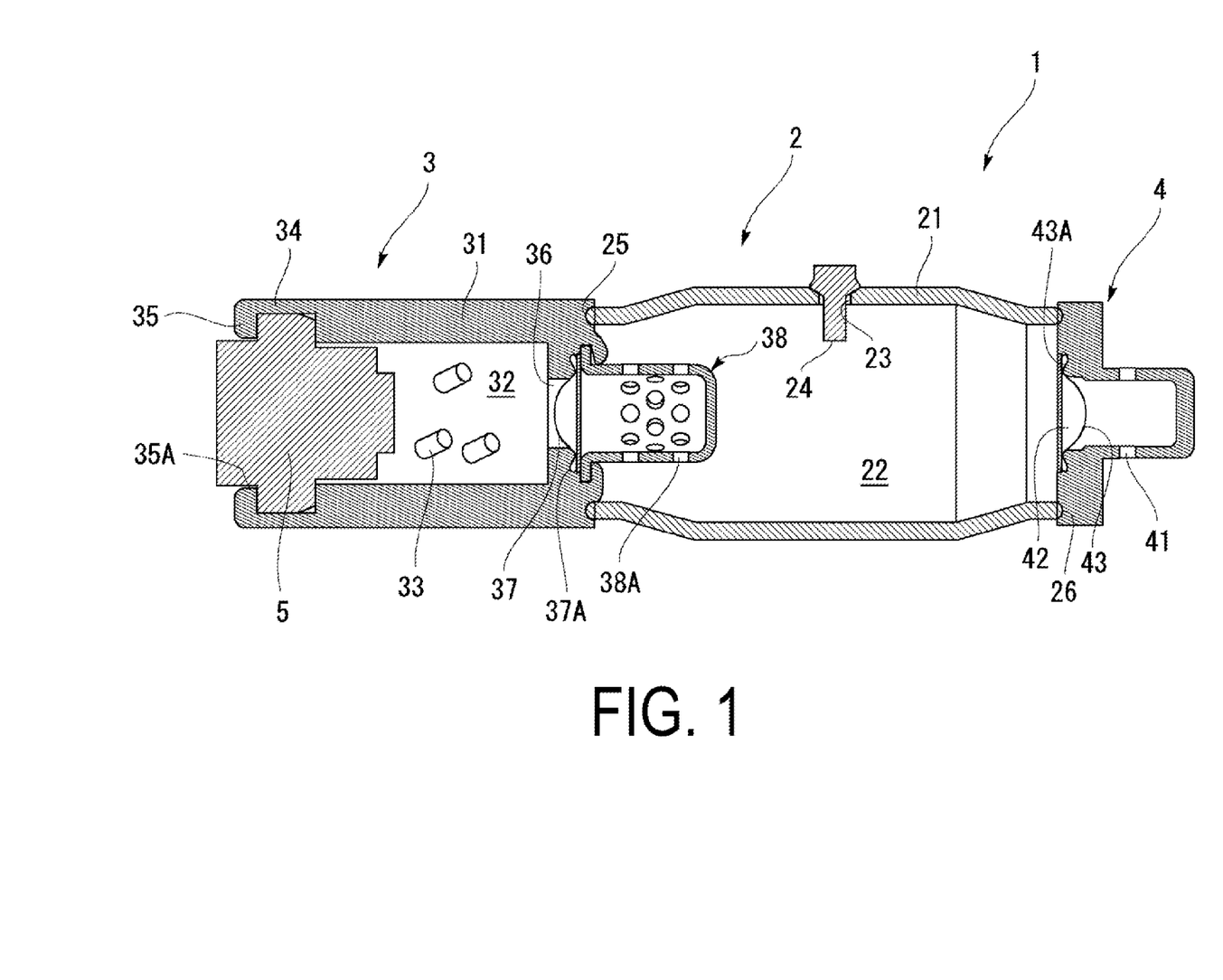
FIG. 1 is a schematic cross-sectional view in an axial direction of an inflator according to a first embodiment.

FIG. 1 is a schematic cross-sectional view in an axial direction of an inflator 1, which is an example of the ignition device assembly according to the first embodiment. The inflator 1 is, for example, an inflator for an airbag, and is a device that supplies an airbag with an operating gas that inflates the airbag (not illustrated) when being activated. The inflator 1 includes a pressurized gas unit 2, a gas generator 3, and a diffuser unit 4.

The pressurized gas unit 2 includes a tubular first housing 21 forming an outer shell, and a pressurized gas chamber 22 filled with a pressurized gas is formed inside the first housing 21. The pressurized gas filled in the pressurized gas chamber 22 may be a pressurized gas including, for example, argon, helium, or a mixture of these. A side surface of the first housing 21 is provided with a filling hole 23 for a pressurized gas, and the filling hole 23 is closed by a closing pin 24 in a state where the pressurizing gas is filled in the pressurized gas chamber 22 through the filling hole 23.

The gas generator 3 includes a tubular second housing 31 forming an outer shell, and a gas generating agent 33 is accommodated in a combustion chamber 32 formed inside the second housing 31. The gas generating agent 33 accommodated in the combustion chamber 32 is not particularly limited, and for example, a known gas generating agent including guanidine nitrate (41 wt. %), basic copper nitrate (49 wt. %), a binder, and an additive can be used. The gas generating agent 33 can have various shapes such as a granular shape, a pellet shape, a columnar shape, and a disk shape.

The gas generator 3 includes an ignition device 5 fixed to one end side of the second housing 31. The reference character 34 in FIG. 1 denotes a tubular fixing portion formed on one end side of the second housing 31. A tubular fixing portion 34 is a tubular opening end, and a tip side of the tubular fixing portion 34 is bent radially inward to form a crimping fixing portion 35. The ignition device 5 is fixed to the second housing 31 by crimping the crimping fixing portion 35 of the tubular fixing portion 34.

Figure 2:
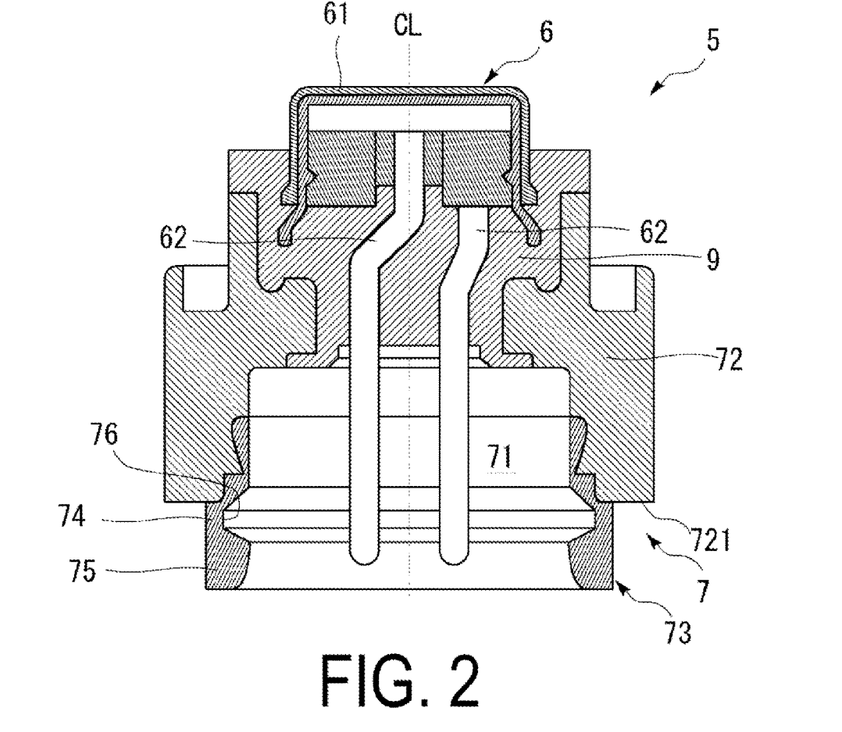
FIG. 2 is a schematic cross-sectional view in an axial direction of an ignition device according to the first embodiment.

FIG. 2 is a schematic cross-sectional view in an axial direction of the ignition device 5 according to the first embodiment. The ignition device 5 includes an igniter body 6, an igniter collar member 7 that holds the igniter body 6, and a resin joint portion 9 integrally joining the igniter body 6 and the igniter collar member 7.

The igniter body 6 is an electric igniter including an ignition portion 61 accommodating an ignition charge (not illustrated) and a pair of electro-conductive pins 62. An ignition current for igniting the ignition charge accommodated in the ignition portion 61 is supplied to the pair of electro-conductive pins 62. A base end side of the pair of electro-conductive pins 62 is held in an electrically insulated state and inserted into the ignition portion 61, and a bridge wire (resistor) (not illustrated) is suspended to couple the base ends of the pair of electro-conductive pins 62 together. The bridge wire may be, for example, a nichrome wire. Further, examples of the ignition charge include ZPP (zirconium/potassium perchlorate), ZWPP (zirconium/tungsten/potassium perchlorate), THPP (titanium hydride/potassium perchlorate), and lead tricinate. The ignition charge is accommodated in the ignition portion 61 in a state of being in contact with the bridge wire.

The igniter collar member 7 includes a tubular wall portion 72 having a tubular shape, made of metal, and including a connector connection space 71 formed inside, and an opening end forming portion 73 extending from a tip side of the tubular wall portion 72 and forming an opening end of the connector connection space 71. The connector connection space 71 is a space into which a connector is insertable. As illustrated in FIG. 2, the pair of electro-conductive pins 62 of the igniter body 6 extends from the ignition portion 61 to the connector connection space 71, and is disposed inside the connector connection space 71.

Here, the tubular wall portion 72 of the igniter collar member 7 has a substantially cylindrical shape. The reference character CL illustrated in FIG. 2 denotes a central axis of the igniter collar member 7. Hereinafter, an end portion of the igniter body 6 positioned proximal to the ignition portion 61 in the axial direction of the tubular wall portion 72 is defined as a base end portion, and an end portion positioned distal to the ignition portion 61 is defined as a tip portion. The reference character 721 in FIG. 2 denotes a tip surface of the tubular wall portion 72. The ignition device 5 is fixed to the second housing 31 by crimping a tip surface 721 of the tubular wall portion 72 in the igniter collar member 7 by the crimping fixing portion 35 of the tubular fixing portion 34. The resin joint portion 9 is formed of, for example, a resin material injection-molded between the igniter body 6 and the tubular wall portion 72 of the igniter collar member 7. For example, the ignition device 5 can be formed by injecting a heated and melted resin material around the igniter body 6 and the igniter collar member 7 each located in the injection molding mold to integrate the igniter body 6 and the igniter collar member 7 with the resin material.

The opening end forming portion 73 of the igniter collar member 7 has a substantially cylindrical shape, and includes a resin region portion made of resin and a metal region portion made of metal. Details of the resin region portion and the metal region portion in the opening end forming portion 73 will be described later. The tubular wall portion 72 and the opening end forming portion 73 of the igniter collar member 7 are coaxially arranged, and the outer diameter of the opening end forming portion 73 is smaller than the outer diameter of the tubular wall portion 72.

The reference character 74 in FIG. 2 denotes a "crimping tip surface opposing region portion" of the opening end forming portion 73. The reference character 75 denotes an opening end portion located on the tip side of the opening end forming portion 73. A crimping tip surface opposing region portion 74 is a portion opposed to a tip surface 35A (see FIG. 1) of the crimping fixing portion 35 of the tubular fixing portion 34 when the ignition device 5 is fixed to the second housing 31 as illustrated in FIG. 1. In the present embodiment, a fitting groove 76 is formed in the crimping tip surface opposing region portion 74 in the opening end forming portion 73 of the igniter collar member 7 as illustrated in FIG. 2. The fitting groove 76 is provided on an inner wall surface of the crimping tip surface opposing region portion 74, which places the fitting groove 76 facing the connector connection space 71. The fitting groove 76 is a groove that extends along the circumferential direction of the inner wall surface of the crimping tip surface opposing region portion 74 and can be fitted with a locking protrusion provided on a connector (not illustrated). The fitting groove 76 may be formed in an annular shape along the circumferential direction of the inner wall surface of the crimping tip surface opposing region portion 74. The fitting groove 76 may be intermittently formed at a plurality of locations on the inner wall surface of the crimping tip surface opposing region portion 74. As illustrated in FIG. 2, the member thickness of the opening end forming portion 73 of the igniter collar member 7 is minimized in the crimping tip surface opposing region portion 74 where the fitting groove 76 is formed. An opening end portion 75 continuous with the tip side of the opening end forming portion 73 is formed of a resin material. Therefore, when the connector is mounted to the connector connection space 71, the opening end portion 75 of the opening end forming portion 73 is bent radially outward by the locking protrusion of the connector, allowing the locking protrusion to be easily fitted with the fitting groove 76.

Furthermore, when the gas generator 3 is described with reference to FIG. 1, the second housing 31 of the gas generator 3 is joined by, for example, resistance welding or the like to a first joint portion 25 formed on one end side of the first housing 21 of the pressurized gas unit 2. A first communication hole 36 formed between the pressurized gas chamber 22 in the pressurized gas unit 2 and the combustion chamber 32 in the gas generator 3 is closed by a bowl-shaped first rupture plate 37 before the gas generator 3 is activated, thereby maintaining the inside of the combustion chamber 32 at normal pressure. For example, a peripheral edge portion 37A of the first rupture plate 37 is resistance-welded to the second housing 31. The first rupture plate 37 is covered with a cap 38 including a gas passing hole 38A to cover the first rupture plate 37 from the pressurized gas chamber 22 side. The cap 38 includes a flange portion whose opening peripheral edge portion is bent outward, and the flange portion is fixed to the other end side of the second housing 31.

As illustrated in FIG. 1, the diffuser unit 4 is connected to a second joint portion 26 formed on the other end side of the first housing 21 of the pressurized gas unit 2. The diffuser unit 4 is a cap body provided with a plurality of gas discharge ports 41 for discharging a combustion gas and a pressurized gas to the outside when the inflator 1 is activated, and is joined to the second joint portion 26 of the first housing 21 by resistance welding or the like, for example. A second communication hole 42 between the pressurized gas chamber 22 and the diffuser unit 4 in the pressurized gas unit 2 is closed by a second rupture plate 43, thereby maintaining the inside of the diffuser unit 4 at normal pressure. For example, a peripheral edge portion 43A of the second rupture plate 43 is resistance-welded to the diffuser unit 4.

When the inflator 1 configured as described above is activated, an ignition current is supplied to the pair of electro-conductive pins 62 in the ignition device 5 (igniter body 6) through the connector connected to an external power supply. As a result, the bridge wire generates heat, the ignition charge in the ignition portion 61 is ignited and combusted, and a combustion product (for example, flame) is generated. Then, the combustion product (for example, flame) of the ignition charge is emitted from the ignition portion 61, and the gas generating agent 33 accommodated in the combustion chamber 32 is ignited. As a result, the gas generating agent 33 is combusted, and a combustion gas is generated. When the first rupture plate 37 is ruptured as a pressure in the combustion chamber 32 rises due to a high-temperature combustion gas, the combustion gas flows into the pressurized gas chamber 22. As a result, the second rupture plate 43 is ruptured due to the pressure rise in the pressurized gas chamber 22, and the pressurized gas and the combustion gas are discharged to the outside from the gas discharge port 41 of the diffuser unit 4 and supplied to the airbag.

Next, a detailed structure of the igniter collar member 7 configuring the ignition device 5 crimped by the crimping fixing portion 35 in the second housing 31 will be described. As described below, in the igniter collar member 7 according to the present disclosure, at least a part of the crimping tip surface opposing region portion 74 is formed of the metal region portion made of metal.

Figure 3:
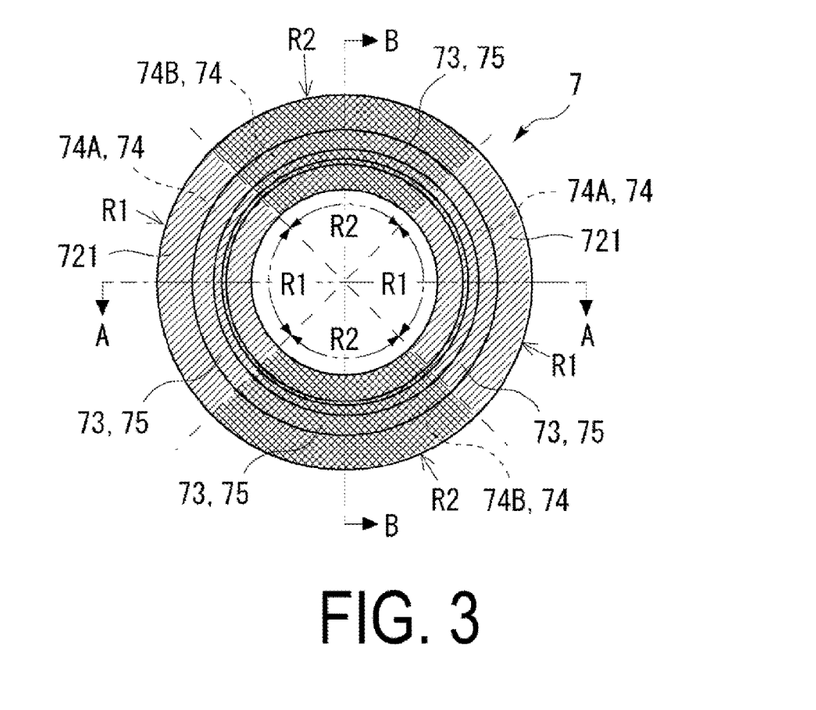
FIG. 3 is a schematic view of an igniter collar member according to the first embodiment as viewed from a tip side.
Figure 4:
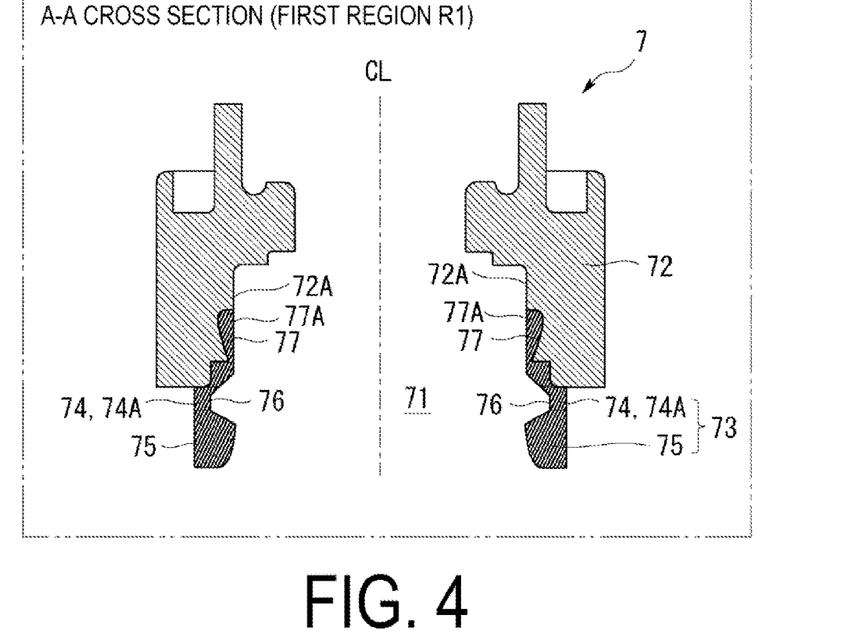
FIG. 4 is a view illustrating an A-A cross section corresponding to a first region of the igniter collar member according to the first embodiment.
Figure 5:
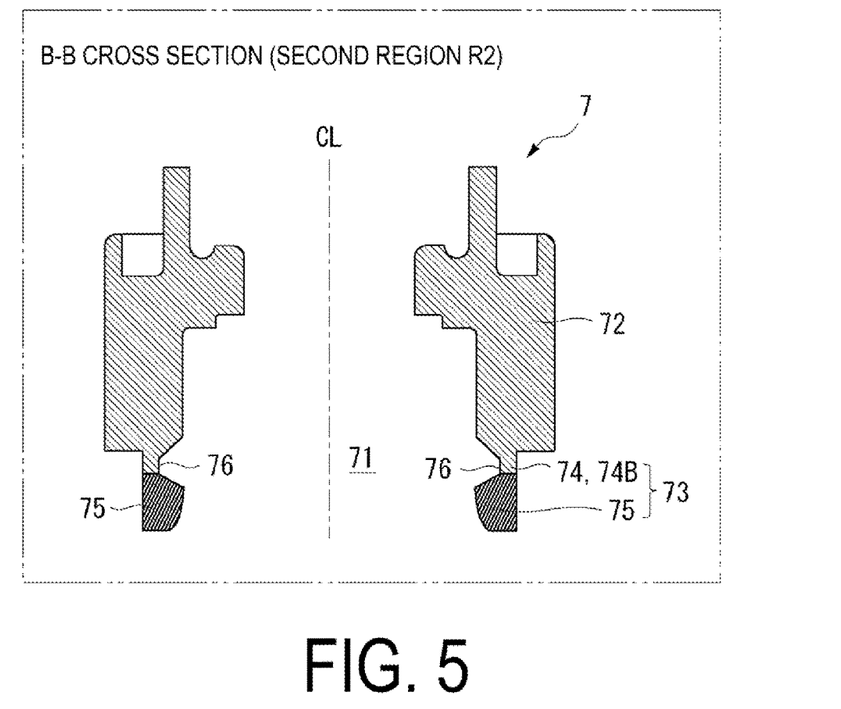
FIG. 5 is a view illustrating a B-B cross section corresponding to a second region of the igniter collar member according to the first embodiment.

FIG. 3 is a schematic view of the igniter collar member 7 according to the first embodiment as viewed from the tip side. In the circumferential direction of the igniter collar member 7, an obliquely hatched region is referred to as a "first region R1", and a lattice-hatched region is referred to as a "second region R2". FIG. 4 is a view illustrating an A-A cross section corresponding to a first region R1 of the igniter collar member 7 according to the first embodiment. FIG. 5 is a view illustrating a B-B cross section corresponding to a second region R2 of the igniter collar member 7 according to the first embodiment. In FIGS. 3 to 5, illustration of the igniter body 6 and the resin joint portion 9 in the ignition device 5 is omitted.

In the first region R1 having the A-A cross section illustrated in FIG. 4, the crimping tip surface opposing region portion 74 in the igniter collar member 7 is formed by a resin region portion 74A made of resin. On the other hand, in the second region R2 having the B-B cross section illustrated in FIG. 5, the crimping tip surface opposing region portion 74 in the igniter collar member 7 is formed by a metal region portion 74B made of metal. That is, a portion, in the circumferential direction, of the crimping tip surface opposing region portion 74 in the igniter collar member 7 of the present embodiment is formed by the resin region portion 74A, and the remaining portion is formed by the metal region portion 74B. In FIGS. 4 and 5, lightly hatched regions indicate regions formed of the metal material, and darkly hatched regions indicate regions formed of the resin material.

That is, in the second region R2 of the igniter collar member 7, the tubular wall portion 72 and the crimping tip surface opposing region portion 74 (metal region portion 74B) of the igniter collar member 7 are formed of an integrated metal material, and the opening end portion 75 is formed of a resin material. On the other hand, in the first region R1 of the igniter collar member 7, the tubular wall portion 72 of the igniter collar member 7 is formed of a metal material, and the crimping tip surface opposing region portion 74 (resin region portion 74A) and the opening end portion 75 are formed of an integrated resin material. In the example illustrated in FIG. 4, the inner peripheral side of the tubular wall portion 72 in the igniter collar member 7 is provided with a resin covering portion 77 integrally resin-molded with the resin region portion 74A of the crimping tip surface opposing region portion 74. The resin covering portion 77 partially covers the inner wall surface of the tubular wall portion 72 by extending from the crimping tip surface opposing region portion 74 (resin region portion 74A) toward the base end side of the tubular wall portion 72, and includes a resin inner wall surface 77A defining the connector connection space 71. The reference character 72A illustrated in FIG. 4 denotes a metal inner wall surface of the inner wall surface of the tubular wall portion 72 that is not covered with the resin covering portion 77. In the example illustrated in FIG. 4, the resin inner wall surface 77A is connected flush with the metal inner wall surface 72A in the tubular wall portion 72 of the igniter collar member 7. In this manner, since the metal inner wall surface 72A of the tubular wall portion 72 and the resin inner wall surface 77A are flush with each other, the connector can be smoothly inserted into the connector connection space 71.

As described above, in the igniter collar member 7 in the present embodiment, the resin region portion 74A and the metal region portion 74B are alternately provided along the circumferential direction of the crimping tip surface opposing region portion 74. In the example illustrated in FIG. 3, the resin region portion 74A and the metal region portion 74B are alternately arranged at two places in the circumferential direction of the crimping tip surface opposing region portion 74, and the center angle at which each resin region portion 74A and metal region portion 74B extends in the circumferential direction is 90°. That is, lengths (arc lengths) of each resin region portion 74A and metal region portion 74B extending along the circumferential direction of the crimping tip surface opposing region portion 74 are equal to each other. However, the aspects of the resin region portion 74A and the metal region portion 74B in the igniter collar member 7 can have various aspects as described later in other embodiments.

Figure 6:
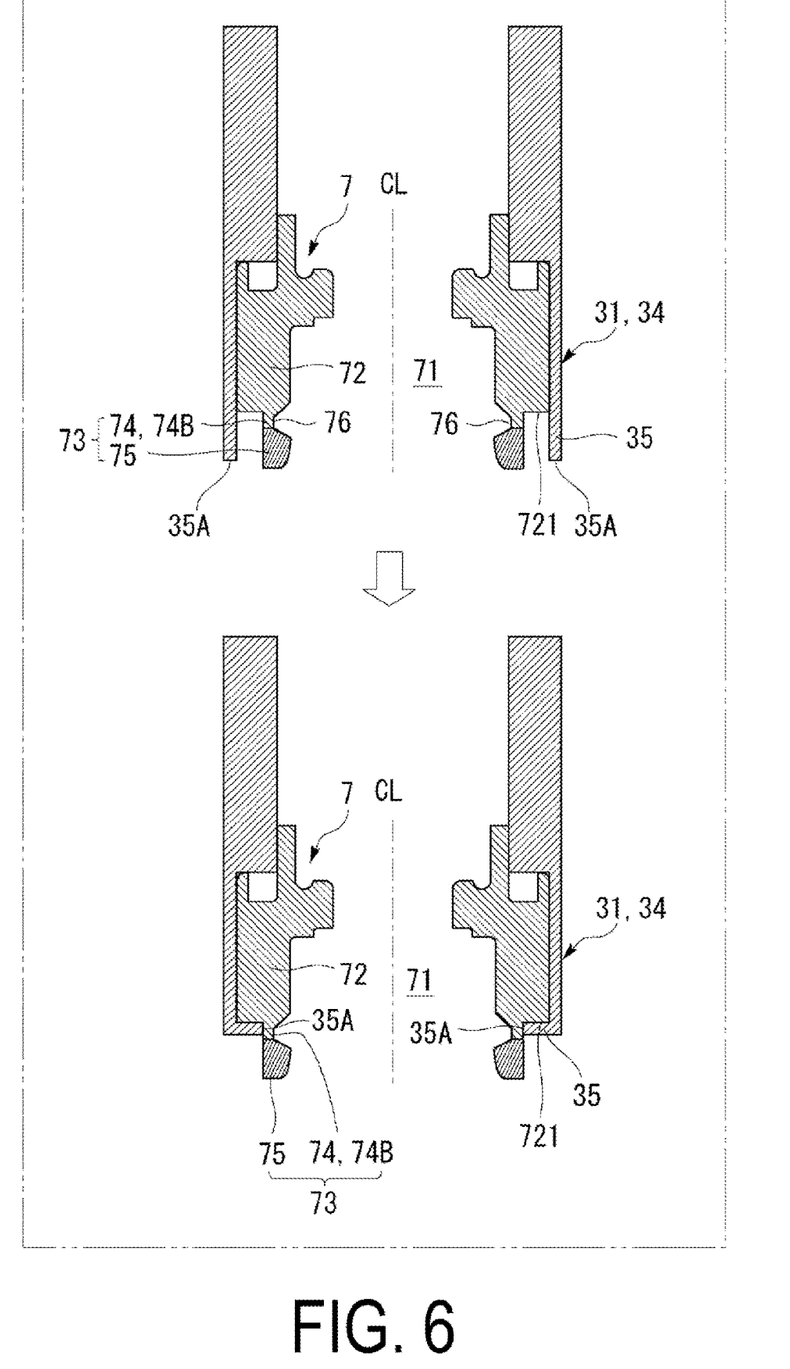
FIG. 6 is a view illustrating a situation in which an ignition device is fixed to a tubular fixing portion of a second housing according to the first embodiment.

FIG. 6 is a view illustrating a situation in which the ignition device 5 is fixed to the tubular fixing portion 34 of the second housing 31 according to the first embodiment. In FIG. 6, illustration of the igniter body 6 and the resin joint portion 9 in the ignition device 5 is omitted. FIG. 6 indicates the B-B cross section corresponding to the second region R2 of the igniter collar member 7.

When the ignition device 5 is fixed to the tubular fixing portion 34 of the second housing 31, the igniter collar member 7 in the ignition device 5 is inserted into the tubular fixing portion 34 of the second housing 31 as illustrated in the upper part of FIG. 6. Then, the tip surface 721 of the tubular wall portion 72 is fixed by the crimping fixing portion 35 formed by bending the tip side of the tubular fixing portion 34 radially inward. In this manner, as illustrated in the lower part of FIG. 6, the ignition device 5 is attached to the second housing 31 in a state where the tip surface 721 of the tubular wall portion 72 abuts against the crimping fixing portion 35 of the tubular fixing portion 34. In such a case, since the tip surface 35A of the crimping fixing portion 35 of the tubular fixing portion 34 arranged along the tip surface 721 of the tubular wall portion 72 is arranged opposite to the crimping tip surface opposing region portion 74 of the opening end forming portion 73, the tip surface 35A of the crimping fixing portion 35 may abut and interfere with the crimping tip surface opposing region portion 74.

On the other hand, in the present embodiment, as described with reference to FIGS. 3 to 5, the resin region portion 74A and the metal region portion 74B are alternately formed along the circumferential direction of the crimping tip surface opposing region portion 74 of the opening end forming portion 73. Since the metal region portion 74B is formed of metal, even if the tip surface 35A of the crimping fixing portion 35 is pressed, deformation can be suppressed. A portion, in the circumferential direction, of the crimping tip surface opposing region portion 74 of the opening end forming portion 73 is formed by the resin region portion 74A made of resin, but the resin region portion 74A and the metal region portion 74B are alternately formed. Thus, even if the resin region portion 74A is deformed when the tip surface 35A of the crimping fixing portion 35 is pressed against the resin region portion 74A of the crimping tip surface opposing region portion 74, the amount of bending radial inward deformation as a whole of the crimping tip surface opposing region portion 74 can be reduced by the metal region portions 74B on both sides. As a result, it is possible to suppress a decrease in the opening region (opening area in the connector connection space 71) of the opening end portion 75 in the opening end forming portion 73. This makes it possible to suppress the connector from being difficult to be inserted into the connector connection space 71.

In the present embodiment, since a portion, in the circumferential direction, of the crimping tip surface opposing region portion 74 is formed by the resin region portion 74A, a contact area between the resin portion and the metal portion that form the igniter collar member 7 can be secured. More specifically, the resin material of the opening end portion 75 in the igniter collar member 7 can be suppressed from rotating with respect to the metal region portion 74B forming the crimping tip surface opposing region portion 74 in the second region R2.

In the present embodiment, since the fitting groove 76 is formed to face the connector connection space 71 along the circumferential direction of the inner wall surface of the crimping tip surface opposing region portion 74, the member thickness of the opening end forming portion 73 is minimized in the crimping tip surface opposing region portion 74. It is deemed that the crimping tip surface opposing region portion 74 thinned in this manner tends to be inherently a structural weak point. On the other hand, in the present embodiment, by forming at least a part of the crimping tip surface opposing region portion 74 by the metal region portion 74B, the above-described structural weak point can be suppressed from becoming apparent.

Variation

Figure 7:
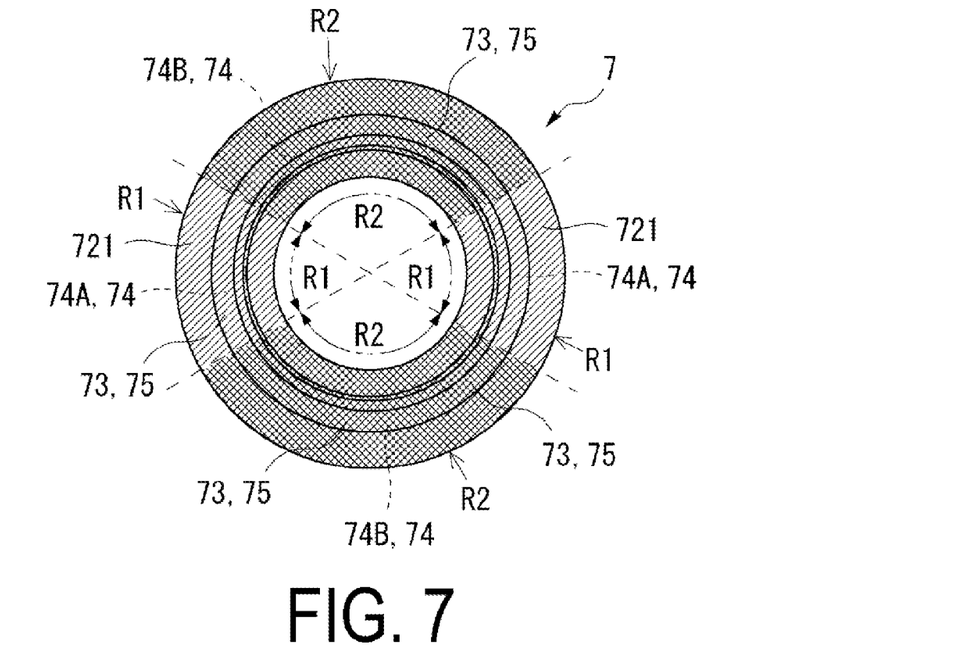
FIG. 7 is a view illustrating arrangement patterns of a resin region portion and a metal region portion in a crimping tip surface opposing region portion according to a first variation of the first embodiment.
Figure 8:
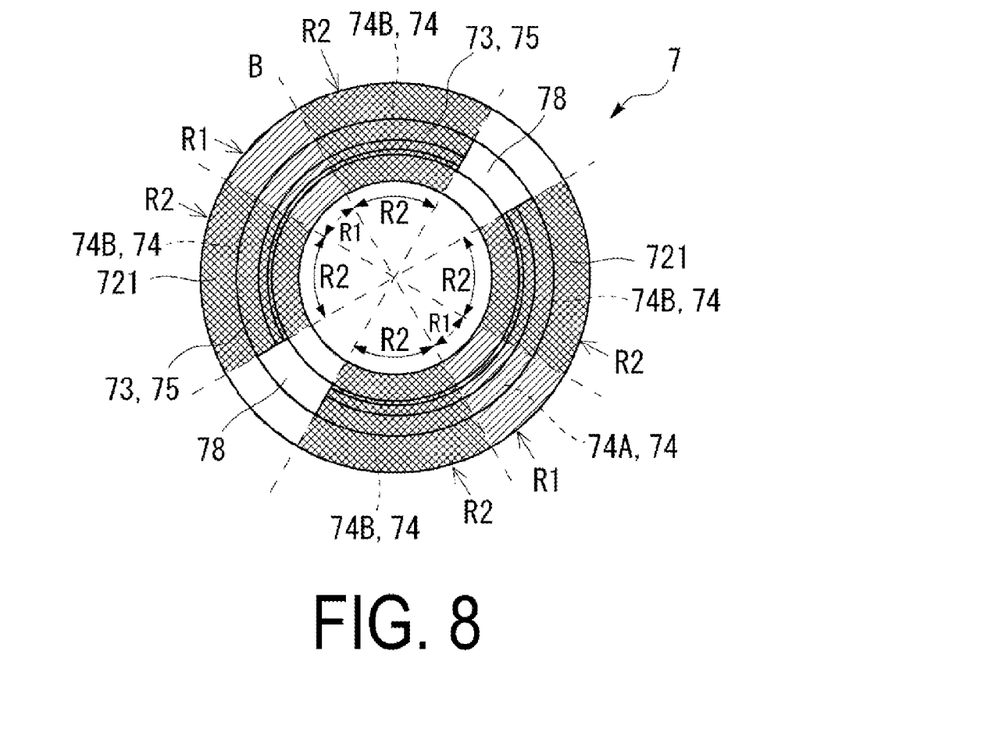
FIG. 8 is a view illustrating an arrangement pattern of a resin region portion and a metal region portion in a crimping tip surface opposing region portion according to a second variation of the first embodiment.

Here, various aspects can be adopted as aspects of the resin region portion 74A and the metal region portion 74B arranged along the circumferential direction of the crimping tip surface opposing region portion 74 in the igniter collar member 7. FIGS. 7 and 8 are views illustrating the arrangement patterns of the resin region portion 74A and the metal region portion 74B in the crimping tip surface opposing region portion 74 according to the first and second variations of the first embodiment. FIGS. 7 and 8 schematically illustrate a state in which the igniter collar member 7 is viewed from the tip side. In FIGS. 7 and 8, similarly to FIG. 3, the "first region R1" in which the crimping tip surface opposing region portion 74 is formed by the resin region portion 74A is obliquely hatched, and the "second region R2" in which the crimping tip surface opposing region portion 74 is formed by the metal region portion 74B is lattice-hatched. In FIGS. 7 and 8, illustration of the igniter body 6 and the resin joint portion 9 in the ignition device 5 is omitted.

In the first variation illustrated in FIG. 7, two first regions R1 and two second regions R2 are alternately formed in the circumferential direction in the igniter collar member 7, and the center angle corresponding to each second region R2 is larger than the center angle corresponding to each first region R1. As a result, the circumferential length of each of the metal region portions 74B provided at a plurality of locations in the circumferential direction of the crimping tip surface opposing region portion 74 is longer than the circumferential length of each of the resin region portions 74A. In other words, in the circumferential direction of the crimping tip surface opposing region portion 74, the total circumferential length of the metal region portion 74B is longer than the total circumferential length of the resin region portion 74A. As a result, when the crimping fixing portion 35 of the tubular fixing portion 34 in the second housing 31 is fixed to the tubular wall portion 72 in the igniter collar member 7, even if the tip surface 35A of the crimping fixing portion 35 interferes with the crimping tip surface opposing region portion 74 in the opening end forming portion 73, the crimping tip surface opposing region portion 74 can be made even more resistant to bending.

Next, in the second variation illustrated in FIG. 8, a void portion (notch) 78 in which the opening end forming portion 73 is notched in a groove shape is formed at two positions of the opening end forming portion 73 in the igniter collar member 7. Thus, in the present variation, the opening end forming portion 73 is not formed in the part where the void portion 78 is formed. In the example illustrated in FIG. 8, the first region R1 and the second region R2 are formed in a region, of the igniter collar member 7, where the void portion 78 is not formed. In the present variation, the positions, the number, the range, and the like of the first region R1 and the second region R2 formed in the circumferential direction of the igniter collar member 7, and the void portion 78 are not particularly limited. However, as described above, it is preferable that the total circumferential length in the metal region portion 74B of the crimping tip surface opposing region portion 74 is longer than the total circumferential length in the resin region portion 74A and the void portion 78. As a result, when the igniter collar member 7 is fixed to the tubular fixing portion 34 in the second housing 31, the crimping tip surface opposing region portion 74 of the igniter collar member 7 is more resistant to bending.

At least a part of the crimping tip surface opposing region portion 74 of the igniter collar member 7 in the present embodiment is required to be formed by the metal region portion 74B. Thus, the entire crimping tip surface opposing region portion 74 may be formed by the metal region portion 74B. For example, the cross section of the crimping tip surface opposing region portion 74 over the entire circumference may be configured by the B-B cross section illustrated in FIG. 5. According to such an aspect, when the igniter collar member 7 is fixed to the tubular fixing portion 34 in the second housing 31, the crimping tip surface opposing region portion 74 of the igniter collar member 7 is more resistant to bending.

When the entire crimping tip surface opposing region portion 74 in the igniter collar member 7 is formed by the metal region portion 74B, the contact area between the resin portion and the metal portion forming the igniter collar member 7 is reduced, and this may make it difficult to secure the fixing strength of the resin portion with respect to the metal portion. In such a case, an aspect according to the third variation described below may be adopted.

Figure 9:
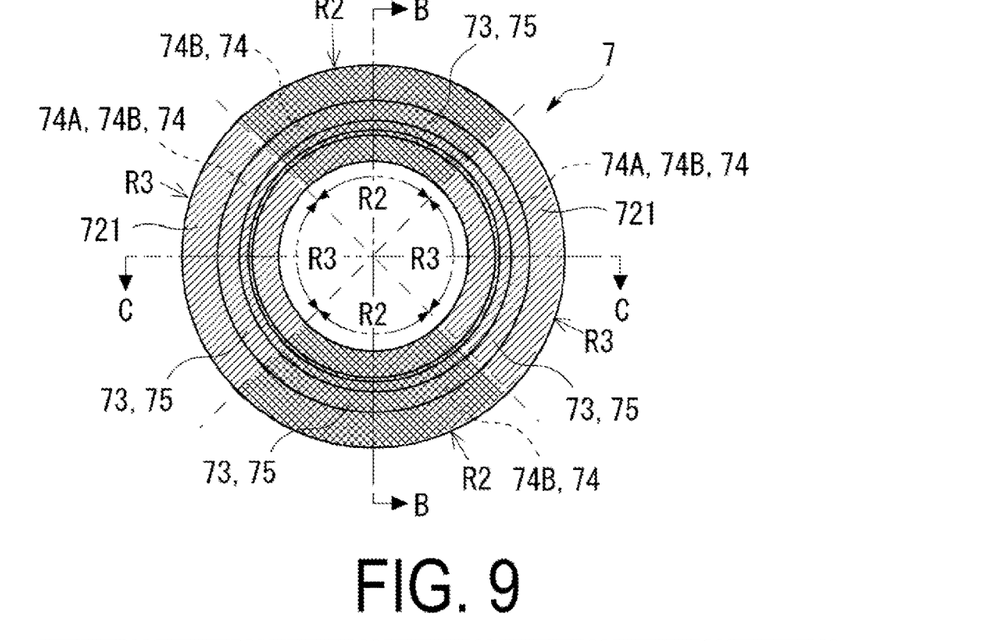
FIG. 9 is a schematic view of an igniter collar member according to a third variation of the first embodiment as viewed from a tip side.
Figure 10:
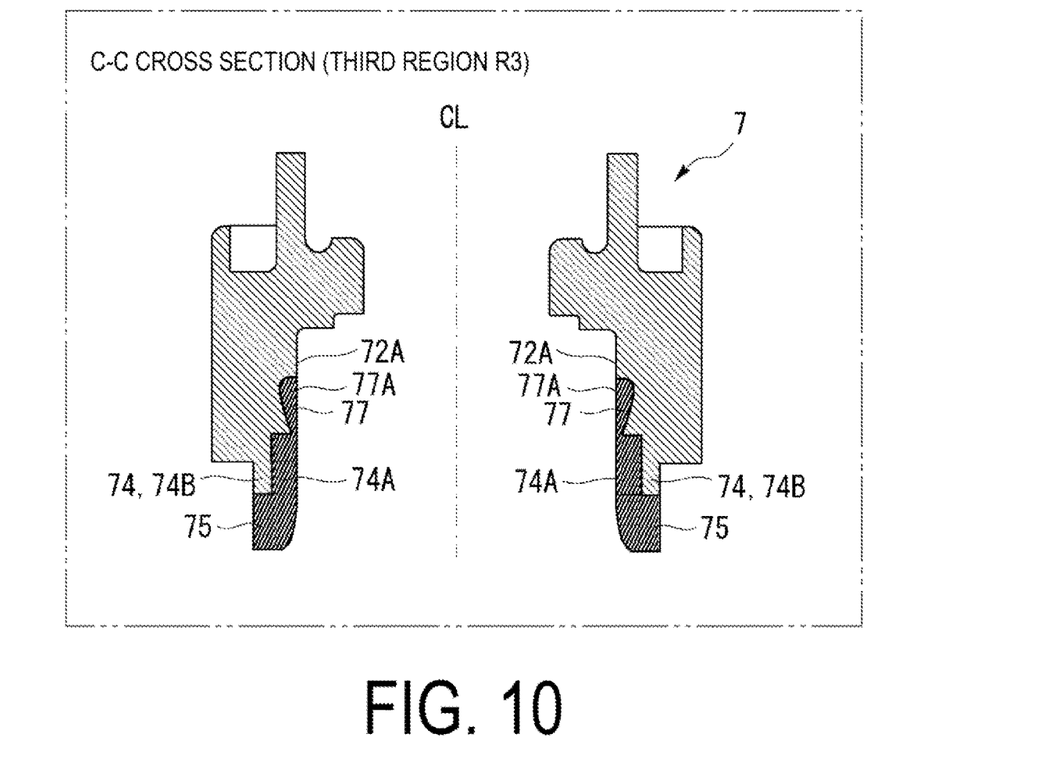
FIG. 10 is a view illustrating a C-C cross section corresponding to a third region of an igniter collar member according to a third variation of the first embodiment.

FIG. 9 is a schematic view of the igniter collar member 7 according to the third variation of the first embodiment as viewed from the tip side. The illustrated second region R2 is same as or similar to that of the first embodiment. An illustrated third region R3 is a region in which the outer peripheral side of the crimping tip surface opposing region portion 74 is formed by the metal region portion 74B and the inner peripheral side is formed by the resin region portion 74A. FIG. 10 is a view illustrating a C-C cross section corresponding to a third region R3 of the igniter collar member 7 according to the third variation of the first embodiment. In FIGS. 9 and 10, illustration of the igniter body 6 and the resin joint portion 9 in the ignition device 5 is omitted.

As illustrated in FIG. 9, in the igniter collar member 7 according to the third variation, the second region R2 and the third region R3 are alternately formed in the circumferential direction. The cross-sectional structure in the second region R2 of the igniter collar member 7 is as described in FIG. 5. On the other hand, in the cross-sectional structure in the third region R3 of the igniter collar member 7, as illustrated in FIG. 10, the metal region portion 74B is disposed on the outer peripheral side of the crimping tip surface opposing region portion 74, and the resin region portion 74A is disposed on the inner peripheral side of the metal region portion 74B. The metal region portion 74B forming the crimping tip surface opposing region portion 74 in the second region R2 of the igniter collar member 7 and the metal region portion 74B forming the crimping tip surface opposing region portion 74 in the third region R3 are annularly continuous.

Furthermore, in the third region R3 of the igniter collar member 7 in the present variation, the resin region portion 74A of the crimping tip surface opposing region portion 74 is integrally and continuously formed with the resin covering portion 77 and the opening end portion 75. Thus, the contact area between the resin portion and the metal portion that form the igniter collar member 7 can be secured, and the fixing strength of the resin portion to the metal portion can be increased. In the igniter collar member 7 in the present variation, the fitting groove 76 is formed only in the second region R2 (see FIG. 5), and the fitting groove 76 is not formed in the third region R3. Accordingly, in the crimping tip surface opposing region portion 74 corresponding to the third region R3 of the igniter collar member 7, the resin thickness of the resin region portion 74A disposed on the inner peripheral side of the metal region portion 74B can be easily secured, and the fixing strength of the resin region portion 74A to the metal region portion 74B can be increased. As described in the present variation, the fitting groove 76 does not necessarily need to be formed over the entire circumference of the crimping tip surface opposing region portion 74, and is only required to be provided at a position corresponding to the locking protrusion provided in the connector mounted in the connector connection space 71. As long as the resin thickness of the resin region portion 74A is secured, the fitting groove 76 can be formed only in the third region R3.

Figure 11:
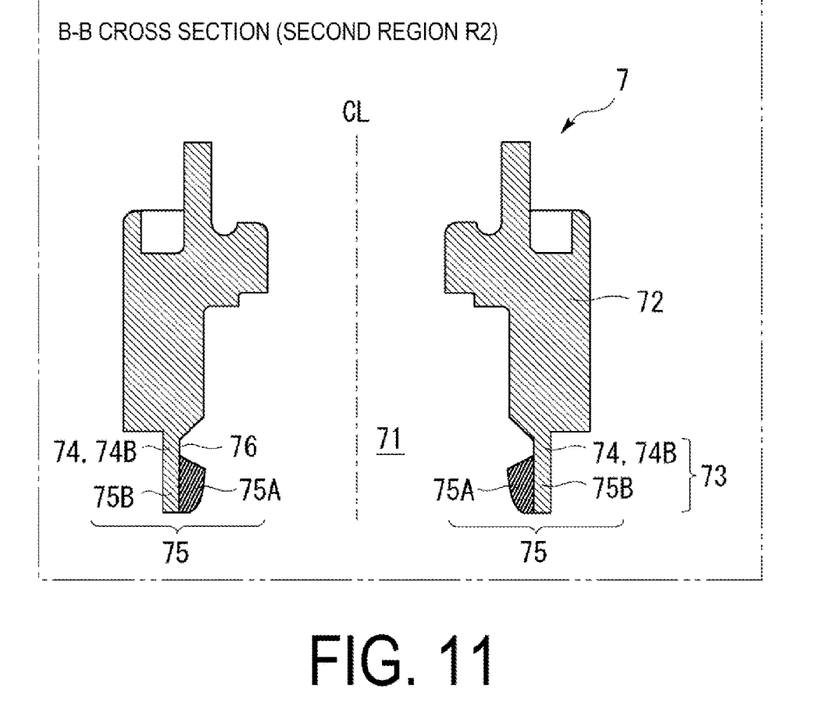
FIG. 11 is a view illustrating a variation of a B-B cross section corresponding to a second region R2 of an igniter collar member 7 illustrated in FIG. 5.

FIG. 11 is a view illustrating a variation of the B-B cross section corresponding to the second region R2 of the igniter collar member 7 illustrated in FIG. 5. In FIG. 11, illustration of the igniter body 6 and the resin joint portion 9 in the ignition device 5 is omitted. In the B-B cross section according to the variation illustrated in FIG. 11, the opening end portion 75 includes a resin region portion 75A and a metal region portion 75B. As illustrated in FIG. 11, the metal material forming the crimping tip surface opposing region portion 74 (metal region portion 74B) extends to the tip of the opening end forming portion 73, thereby forming the metal region portion 75B of the opening end portion 75, and forming the resin region portion 75A inside the metal region portion 75B. The cross-sectional structure illustrated in FIG. 4 can be adopted for the A-A cross section corresponding to the first region R1 of the igniter collar member 7 according to the variation in which the B-B cross section illustrated in FIG. 11 is adopted. In this case, in the A-A cross section, as illustrated in FIG. 4, the crimping tip surface opposing region portion 74 (resin region portion 74A), the opening end portion 75, and the resin covering portion 77 are formed of an integrated resin material. The resin material forming the resin region portion 75A of the opening end portion 75 in the B-B cross section can be continuously formed integrally along the circumferential direction with the resin material forming the opening end portion 75 in the A-A cross section. Thus, the metal portion and the resin portion configuring the igniter collar member 7 can be firmly fixed.

Second Embodiment

Next, an ignition device 5 according to the second embodiment will be described. The ignition device 5 according to the second embodiment differs from that in the first embodiment in aspects of the igniter collar member 7, and other aspects are the same as or similar to those in the first embodiment. Hereinafter, differences from the first embodiment will be mainly described.

Figure 12:
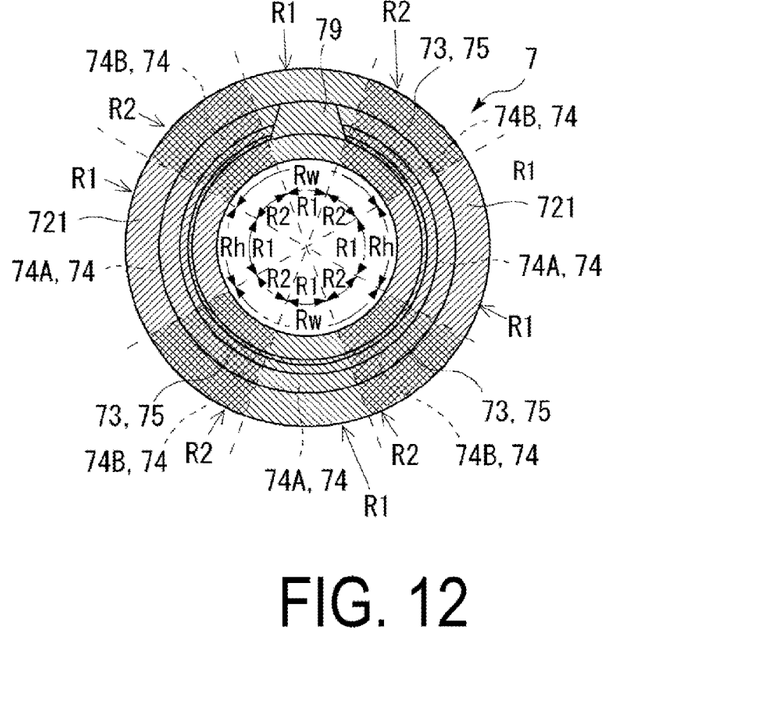
FIG. 12 is a schematic view of an igniter collar member according to a second embodiment as viewed from a tip side.

FIG. 12 is a schematic view of the igniter collar member 7 according to the second embodiment as viewed from the tip side. In FIG. 12, illustration of the igniter body 6 in the ignition device 5 is omitted. Further, in FIG. 12, the "first region R1" in which the crimping tip surface opposing region portion 74 is formed by the resin region portion 74A is obliquely hatched, and the "second region R2" in which the crimping tip surface opposing region portion 74 is formed by the metal region portion 74B is lattice-hatched. The igniter collar member 7 in the present embodiment has a configuration in which a holder member 8 illustrated in FIG. 13 can be mounted in the connector connection space 71.

Figure 13:
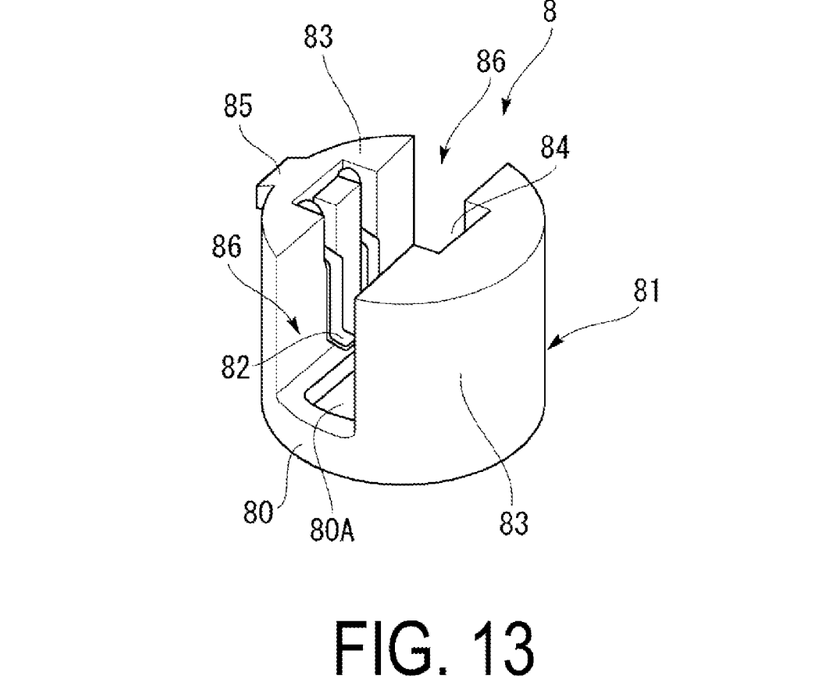
FIG. 13 is a view illustrating a holder member.

The holder member 8 illustrated in FIG. 13 includes a holder body portion 81 made of resin and a short-circuit member 82 made of metal. The holder body portion 81 has a substantially cylindrical outer shape as a whole, and includes a base portion 80 and a pair of holder wall surface portions 83 and 83 erected from the base portion 80. The base portion 80 is provided with an opening portion 80A, through which the pair of electro-conductive pins 62 in the igniter body 6 is insertable. A region of the holder body portion 81 sandwiched between the pair of holder wall surface portions 83 and 83 is provided with a hollow connector insertion portion 84 into which a connector is insertable. The pair of holder wall surface portions 83 and 83 in the holder member 8 is disposed along the tubular wall portion 72 and the opening end forming portion 73 in the igniter collar member 7 in a state where the holder member 8 is inserted into the connector connection space 71.

As illustrated in FIG. 13, an upper end portion of one holder wall surface portion 83 of the holder body portion 81 is provided with a fixing portion 85 engageable with an engaging portion 79 (see FIG. 12) formed at the opening end forming portion 73 of the igniter collar member 7. The fixing portion 85 of the holder body portion 81 is formed as a convex portion formed radially outward. On the other hand, the engaging portion 79 formed at the opening end forming portion 73 of the igniter collar member 7 is formed as a recessed portion (notch portion) into which the fixing portion 85 can be fitted. When the holder member 8 is mounted to the connector connection space 71 of the igniter collar member 7, the fixing portion 85 of the holder body portion 81 is fitted to the engaging portion 79 of the igniter collar member 7, whereby the insertion position of the holder member 8 with respect to the connector connection space 71 is restricted and rotation of the holder member 8 after insertion is restricted.

As illustrated in FIG. 13, the holder body portion 81 is provided with the short-circuit member 82 made of metal. The short-circuit member 82 is provided to face the inside of the connector insertion portion 84, and when the holder member 8 is mounted to the connector connection space 71, the short-circuit member 82 comes into elastic contact with the pair of electro-conductive pins 62 in the igniter body 6 to short-circuit the pair of electro-conductive pins 62. This can suppress the inflator 1 (ignition device 5) from malfunctioning when the inflator 1 is transported or stored. When the connector is inserted into the connector insertion portion 84 of the holder member 8 in a state where the holder member 8 is mounted in the connector connection space 71 of the igniter collar member 7, the connector is pressed against the short-circuit member 82. As a result, the short-circuit member 82 in elastic contact with the pair of electro-conductive pins 62 is separated from the pair of electro-conductive pins 62, and conduction between the connector and the electro-conductive pins 62 is obtained. A protrusion may be formed on the holder wall surface portion 83 of the holder member 8, and when the holder member 8 is mounted to the connector connection space 71, the holder member 8 may be fixed to the igniter collar member 7 by fitting the protrusion of the holder wall surface portion 83 into the fitting groove 76.

Here, the reference character Rw illustrated in FIG. 12 denotes a "holder wall surface opposing region" in the crimping tip surface opposing region portion 74 of the igniter collar member 7. The reference character Rh denotes a "holder wall surface non-opposing region" in the crimping tip surface opposing region portion 74 of the igniter collar member 7. The holder wall surface opposing region Rw is a part of the crimping tip surface opposing region portion 74, and is a region arranged opposite to the pair of holder wall surface portions 83 and 83 in a state where the holder member 8 is mounted in the connector connection space 71 of the igniter collar member 7. In the present embodiment, at least a part of the holder wall surface opposing region Rw in the crimping tip surface opposing region portion 74 is formed by the metal region portion 74B. The holder wall surface non-opposing region Rh is a portion other than the holder wall surface opposing region Rw in the crimping tip surface opposing region portion 74, and is arranged opposite to a notch portion 86 (see FIG. 13) formed between the pair of holder wall surface portions 83 and 83 in a state where the holder member 8 is mounted in the connector connection space 71 of the igniter collar member 7.

Here, the holder wall surface portions 83 and 83 of the holder member 8 are each arranged inside the holder wall surface opposing region Rw in the crimping tip surface opposing region portion 74. Thus, when the holder wall surface opposing region Rw is bent radially inward when the igniter collar member 7 is fixed to the tubular fixing portion 34 in the second housing 31, each of the holder wall surface portions 83 and 83 is also pushed to the connector insertion portion 84 side accordingly, and the opening width of the connector insertion portion 84 may not be secured according to the regular dimensions. By forming at least a part of the holder wall surface opposing region Rw in the crimping tip surface opposing region portion 74 by the metal region portion 74B, the above-described problem are less likely to occur.

On the other hand, since the holder wall surface non-opposing region Rh in the crimping tip surface opposing region portion 74 is a region arranged opposite to the notch portion 86 of the holder member 8, even when the holder wall surface non-opposing region Rh is slightly bent inward, it hardly affects insertion of the connector into the connector insertion portion 84 in the holder member 8. Thus, in the example illustrated in FIG. 12, the holder wall surface non-opposing region Rh in the crimping tip surface opposing region portion 74 is formed by the resin region portion 74A.

In the example illustrated in FIG. 12, in the holder wall surface opposing region Rw in the crimping tip surface opposing region portion 74, both end portions side in the circumferential direction of the holder wall surface opposing region Rw are formed by the metal region portion 74B, and a region sandwiched therebetween is formed by the resin region portion 74A. In this case, in the holder wall surface opposing region Rw, the total circumferential length of the metal region portion 74B is preferably made longer than the total circumferential length of the resin region portion 74A. According to such an aspect, in the circumferential direction of the holder wall surface opposing region Rw, the region occupied by the metal region portion 74B can be made larger than the region occupied by the resin region portion 74A. This makes it possible to suitably suppress each of the holder wall surface portions 83 and 83 of the holder member 8 from being pushed to the connector insertion portion 84 side. It is obvious that the entire holder wall surface opposing region Rw in the crimping tip surface opposing region portion 74 may be formed by the metal region portion 74B, whereby fall of each of the holder wall surface portions 83 and 83 can be more suitably suppressed.

While embodiments of the ignition device and the ignition device assembly according to the present disclosure have been described above, each aspect disclosed in the present description can be combined with any other features disclosed in the present description. While in the above embodiments, a case where the ignition device and the ignition device assembly are applied to an inflator for an airbag has been described as an example, they may be applied to a gas generator for a pretensioner of a seat belt or another ignition device assembly. A housing other than the housing of the inflator may be an attachment target object to which the ignition device is attached.

REFERENCE SIGNS LIST

1 . . . Inflator
2 . . . Pressurized gas unit
3 . . . Gas generator
4 . . . Diffuser unit
5 . . . Ignition device
6 . . . Igniter body
7 . . . Igniter collar member
9 . . . Resin joint portion
34 . . . Tubular fixing portion
35 . . . Crimping fixing portion
71 . . . Connector connection space
72 . . . Tubular wall portion
73 . . . Opening end forming portion
74 . . . Crimping tip surface opposing region portion
74A . . . Resin region portion
74B . . . Metal region portion
75 . . . Opening end portion
76 . . . Fitting groove

The invention claimed is:

1. An ignition device assembly, comprising:
an ignition device including an igniter body and an igniter collar member holding the igniter body; and
a housing including a tubular fixing portion to which the igniter collar member is fixed, wherein
the tubular fixing portion includes a crimping fixing portion in which a tip side of the tubular fixing portion is bent radially inward,
the igniter collar member includes:
a tubular wall portion having a tubular shape, made of metal, and including a connector connection space formed inside and into which a connector to be connected to the igniter body is insertable, the tubular wall portion being crimped by the crimping fixing portion;
an opening end forming portion including a resin region portion made of resin and a metal region portion made of metal, extending from a tip side of the tubular wall portion, and thus forming an opening end of the connector connection space; and
a crimping tip surface opposing region portion formed at the opening end forming portion and opposed to a tip surface of the crimping fixing portion, and
at least a part of the crimping tip surface opposing region portion is formed by the metal region portion.

2. The ignition device assembly according to claim 1, wherein a portion in a circumferential direction of the crimping tip surface opposing region portion is formed by the resin region portion.

3. The ignition device assembly according to claim 2, wherein in the crimping tip surface opposing region portion, a total circumferential length of the metal region portion is longer than a total circumferential length of the resin region portion.

4. The ignition device assembly according to claim 2, wherein
the metal region portion and the resin region portion are respectively provided at a plurality of locations in a circumferential direction of the crimping tip surface opposing region portion, and
a circumferential length of the metal region portion is longer than a circumferential length of the resin region portion.

5. The ignition device assembly according to claim 1, wherein the metal region portion and the resin region portion are alternately provided along a circumferential direction of the crimping tip surface opposing region portion.

6. The ignition device assembly according to claim 1, wherein a fitting groove is provided along a circumferential direction of an inner wall surface of the crimping tip surface opposing region portion, and the fitting groove is configured to fit with a locking protrusion provided on the connector.

7. The ignition device assembly according to claim 1, wherein a member thickness of the opening end forming portion is minimized at the crimping tip surface opposing region portion.

8. The ignition device assembly according to claim 1, wherein
the igniter collar member further includes a resin covering portion integrally resin-molded with the resin region portion, extending from the resin region portion to a base end side of the tubular wall portion, and thus partially covering an inner wall surface of the tubular wall portion,
the resin covering portion includes a resin inner wall surface defining the connector connection space, and
the resin inner wall surface of the inner wall surface of the tubular wall portion is connected flush with a metal inner wall surface that is not covered with the resin covering portion.

9. The ignition device assembly according to claim 1, wherein
the opening end forming portion is formed in an annular shape, and an outer diameter of the opening end forming portion is smaller than an outer diameter of the tubular wall portion, and
the crimping fixing portion fixes a tip surface of the tubular wall portion.

10. The ignition device assembly according to claim 1, wherein
the igniter body includes a pair of electro-conductive pins extending to the connector connection space,
the connector connection space is provided with a metal short-circuit member configured to maintain the pair of electro-conductive pins in a short-circuit state when the connector is not inserted, and a resin holder member configured to hold the short-circuit member,
the holder member includes a pair of holder wall surface portions positioned along the tubular wall portion and the opening end forming portion and arranged opposite to each other, a hollow connector insertion portion into which the connector is insertable is formed in a region sandwiched between the pair of holder wall surface portions, and
at least a part of a region opposed to the pair of holder wall surface portions in the crimping tip surface opposing region portion is formed by the metal region portion.

11. The ignition device assembly according to claim 1, wherein the housing contains a gas generating agent ignited when the igniter body is activated.

12. An ignition device including an igniter body and an igniter collar member holding the igniter body and fixed to a tubular fixing portion of a housing, wherein
the igniter collar member comprises:

a tubular wall portion having a tubular shape, made of metal, and including a connector connection space formed inside and into which a connector to be connected to the igniter body is insertable, the tubular wall portion being crimped by a crimping fixing portion of the tubular fixing portion of the housing in which a tip side of the tubular fixing portion is bent radially inward, an opening end forming portion including a resin region portion made of resin and a metal region portion made of metal, extending from a tip side of the tubular wall portion, and thus forming an opening end of the connector connection space, and a crimping tip surface opposing region portion formed in the opening end forming portion and opposed to a tip surface of the crimping fixing portion, and at least a part of the crimping tip surface opposing region portion is formed by the metal region portion.

* * * * *